April 28, 1959  R. MEILINGER ET AL  2,884,296
INTERLOCKING MOLDING MEMBERS FOR CABINET ASSEMBLY
AND METHOD OF ASSEMBLY
Filed April 15, 1957  2 Sheets-Sheet 1

INVENTORS
Raymond Meilinger
Bert Meilinger
BY
ATTORNEYS

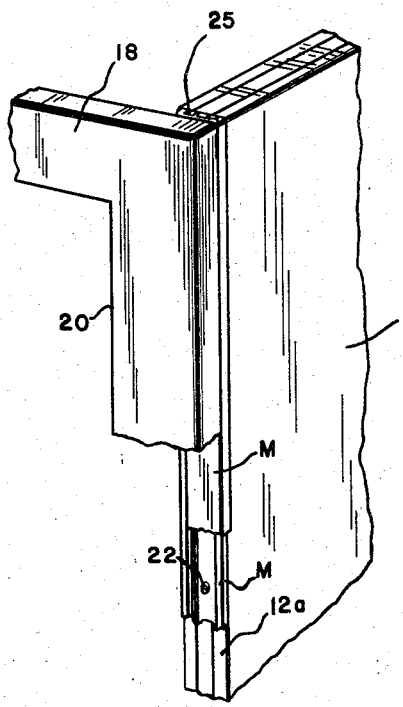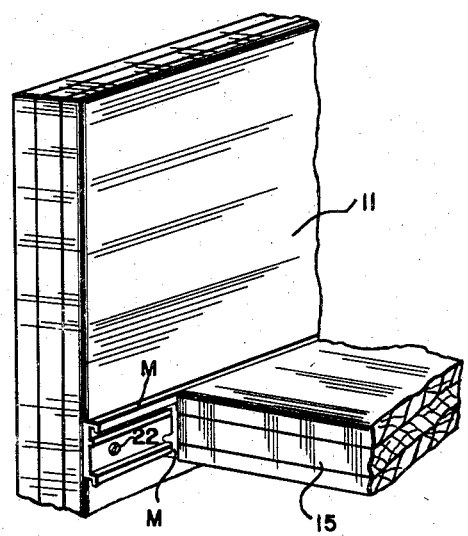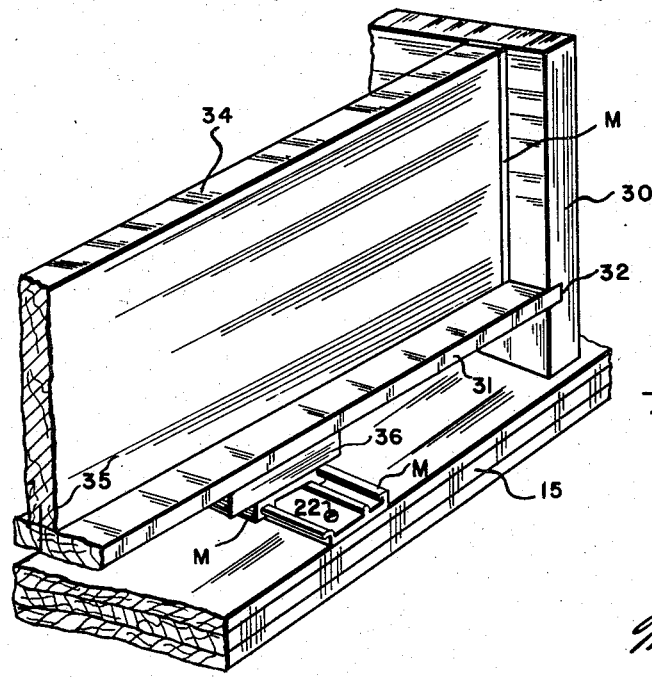

United States Patent Office 2,884,296
Patented Apr. 28, 1959

2,884,296

INTERLOCKING MOLDING MEMBERS FOR CABINET ASSEMBLY AND METHOD OF ASSEMBLY

Raymond Meilinger and Bert Meilinger, Denver, Colo., assignors to Meilinger Fixtures Company, Denver, Colo., a corporation of Colorado Application April 15, 1957, Serial No. 652,832

7 Claims. (Cl. 312—263)

This invention relates to moldings and methods of use therefor, and more particularly, it relates to extruded metallic moldings that interlock together against lateral disengagement and are longitudinally slidable together so that the moldings may be attached to various parts of precut cabinets to provide means for slidably engaging separate members of the molding and to thereby permit slidably joining the parts of the cabinet into assembled position and to provide guide rails for slidably operated members such as drawers, doors, etc.

It is an important object of the invention to provide an extruded metallic molding which may be cut into lengths, and the lengths intermeshed with each other for slidable engagement.

It is another object of the invention to provide a slidable interlocking molding which may be cut into sections and the parts superimposed on one another to provide a slidable connection which is longitudinally slidable but laterally locked against disengagement.

A still further object of the invention is to provide an extruded metallic molding which has means for connection to the joining lines of a structure in position to slidably receive another portion of molding which is attached to an adjoining part of the structure in position to hold the same securely in joining position.

It is still another object of the invention to provide an interlocking molding member which is arranged so that the part of a two-piece molding may be separately attached to moving structure parts to thereby form guide rails for slidable operation of the parts.

It is still another object of the invention to provide an interlocking slidable molding which is arranged for attaching one portion thereof to each side of adjoining members of a building assembly to thereby permit slidable engagement of the moldings for moving the structure portions into assembled position and to hold the portions securely in assembled position.

These and other objects and advantages of the invention may be readily ascertained by referring to the following description and appended drawings in which:

Fig. 4 is an enlarged detail which shows the mounting of the interlocking molding members on abutting vertical cabinet portions and illustrating a method of assembly of the abutting portions;

Fig. 5 is an enlarged detail which illustrates the mounting of the molding sections on abutting horizontal internal members of the precut structure; and Fig. 6 is a detailed view which illustrates a mounting of the molding members as a slide assembly for a slidable drawer.

Figure 1:
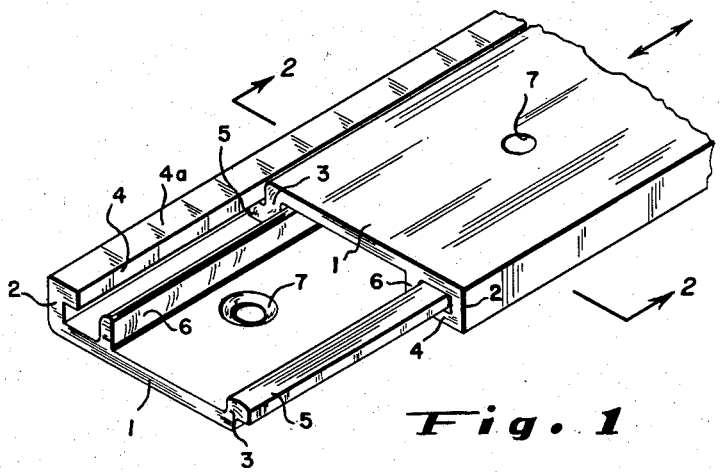
Fig. 1 is a perspective view of a molding assembly according to the invention mounted in slidable relation on a mating portion thereof.
Figure 2:
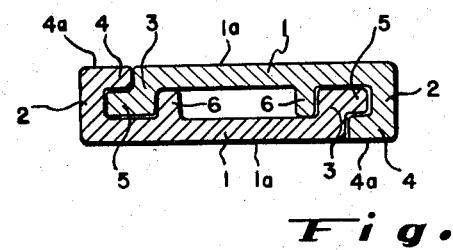
Fig. 2 is a cross sectional view of the interlocked molding portion illustrated in Fig. 1 taken along section line 2—2.

One preferred form of the molding of the invention is illustrated in Figs. 1 and 2, in which two identical portions are in interlocked relation. Each strip of the molding has an identical cross-section and a detail description of one applies to the other. The molding includes a body member 1 which is a flat, elongated aluminum, or other suitable material, strip. A projection 2 is integrally mounted on one side of the body 1 and it extends normal thereto. A projection 3 is integrally mounted on the opposite side of the body 1 and it extends normal to the body 1 and in the same direction as the projection 2, forming in effect a channel. The projection 3, however, is shorter than the projection 2. A flange 4, integrally mounted on projection 2, extends transversely from the projection 2 and substantially parallel to the body 1, directed centerwise thereof. A second flange 5 is mounted on the short projection 3 and it is, likewise, substantially parallel to the body 1. Flange 5 extends in the same direction as the flange 4, however, it extends away from the body 1. The displacement of flange 5 away from the body 1 is sufficient so that the flange will fit in the space under flange 4 when two such molding members are turned face to face with the flange 5 mating in a notch beneath flange 4. In this position the upper surface 4a of the flange 4 is substantially in planar alignment with the outer surface 1a of the body 1, so that the peripheral outline of the superimposed parts is rectangular. To prevent lateral movement of the two members, a longitudinal rib 6 is integrally mounted on the body 1 at a point spaced from and adjacent to the flange 2. In interlocking position, the inner edge of the projection 3 is contacting the rib 6 which prevents transverse movement but permits longitudinal sliding.

Since the device is so made that identical portions may be slidably interlocked together. A single extrusion or other method of making an elongated strip is all that is necessary. The length of molding desired is cut from the elongated strip, then a second strip is cut the same length or as desired. The two lengths of molding may then be turned on one another and moved onto slidable engagement as illustrated in Fig. 1. For attaching the molding to a member a counter-sunk screw hold 7 is provided in the body or web 1 at desired intervals along its longitudinal length.

The molding of the invention has several important uses in building structures, cabinets and the like. In one preferred use, the molding of the invention provides a connection between parts of a precut wooden cabinet. In another use, the molding provides runners for movable parts of a structure, as for example, a cabinet drawer, sliding doors, windows and the like. One important use of the molding is to provide a quick, positive joint between adjoining members where ordinarily clamps or jigs would be used to hold the parts until the joint is completed. With the moldings, no jigs or clamps are needed. In the assembly of precut building structures and the like, the molding assembly of the invention is used for the connecting of adjoining parts of a structure, and by cutting the molding to the length of the part, the molding part may be attached to all joining structures and the parts may be slidably moved into interlocked and assembled position.

Figure 3:
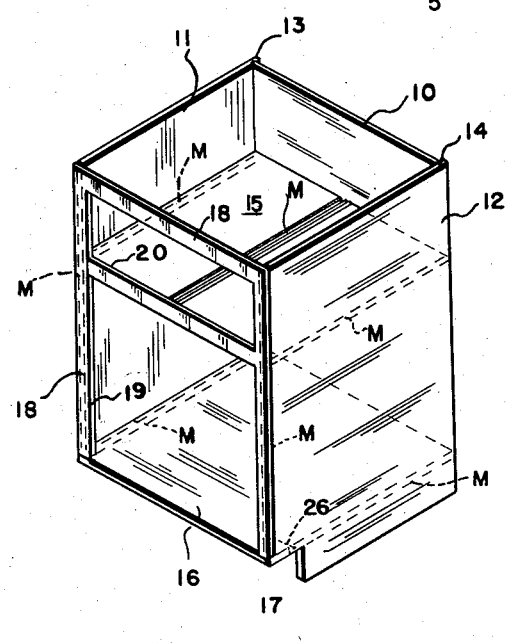
Fig. 3 is a perspective view of an assembled cabinet position illustrating various uses of the molding assembly of Fig. 1 in the assembly of a cabinet structure.

The cabinet illustrated in Fig. 3 demonstrates a number of uses of the molding of the invention. Such a cabinet may be joined to other similar cabinets, and the unit when assembled may be assembled with a top to form, for example, a kitchen base cabinet. Wall cabinets of similar construction may be similarly made, and hung on the wall above the base units. For simplicity, the single unit cabinet is illustrated, and it is obvious, however, that the same principles apply in all similar construction.

In the cabinet illustrated, a back 10, which may be masonite, or a thin plywood back, or the like, is normally plowed into two standards or side members 11 and 12, such as in a groove or dado 13 and 14 respectively on the standards 11 and 12. A shelf 15 is mounted in the upper portion of the cabinet between the two side walls and a lower shelf 16 is mounted in the lower portion of the cabinet. The standards include a foot space or notch 17 immediately below the lower shelf 16. The front or face frame 18 is secured to the front edges of the standards 11 and 12 to complete the rough assembly of the cabinet. A top (not shown) may be assembled on top of the device closing the top opening, and doors (not shown) may be provided to close the lower opening 19 thereof. A drawer may be slidably engaged in the upper opening 20. The moldings of the invention are used in the construction of the cabinet and are indicated by the letter M. The details of the various uses are described below.

The shelf 15, Fig. 5, has a length of molding M attached along one edge thereof, and the standard 11 has a similar length of molding M (substantially the same length as the width of the standard) fastened along the shelf joining line by means of screws 22 in the holes 7. A molding length is fastened to the opposite standard 12 in the same relative position as on the standard 11, and a molding length is secured on the opposite side of the shelf 15. By securing moldings on the lower portion of both standards, the lower shelf 16, with a molding length attached to each of its edges may be slidably moved along engaging moldings to assembled position. The upper shelf 15 may be slid along its cooperative moldings into place between the standards. With the back 10 in place the shelves are slid along the moldings to abut the back. If the moldings have been positioned correctly on the standards, the two shelf members will hold the standards in square, upright position, and, further, helping the bracing of the standards by the back.

The face frame 18 is assembled with the standards 11 and 12, Fig. 4, after securing a molding strip M along the outer edge 25 on one side of the frame 18, and by securing the molding member M to the front edge 12a of the standard 12 by screws 22. A molding (not shown in detail) is similarly secured to the opposite side of the face frame and the front edge of the standard 11. The face frame is then assembled with the standards by engaging the moldings and sliding the face frame into position along the standards. The shelf 16, by extending beyond the edge of the standard may provide a stop for the face frame to prevent further downward movement. Also, by putting nails 26 through the standards into the shelf 16, the shelf 16 may be secured in place, and the main assembly of the cabinet is complete. Any other means may, of course, be used to secure the shelf in position. The cabinet is then secured in position on the wall and/or the floor, where desired, and a top such as a Formica, linoleum, tile etc. or a plain wooden top may be secured to the cabinet to complete the structure. A door or doors mounted on hinges, not shown, may be utilized to close the lower space 19 in the base frame. A drawer, which is partially shown in detail in Fig. 6 may be used to close the upper opening 20.

The drawer, partially shown in Fig. 6, is assembled in a similar manner to that of the cabinet utilizing the molding members for securing the parts together. The drawer includes a side 30 having a bottom 31 plowed or dadoed into the lower portion thereof in a groove 32, and a similar member is, of course, secured to the opposite side to form a major portion of the drawer. A front is, also, secured to the bottom and to the front edges of the side members, as is well known in the art. A drawer back 34 is secured to the side by means of the molding M, half of which is secured to the back 34 and half to the side 30. A pair of moldings are, likewise, secured to the opposite sides of the back 34 and the back is then assembled with the sides by sliding the moldings together so that the back is in position indicated. The front may be assembled with the sides in a similar manner. The back may be tacked into place by means of nails 35 extending through the bottom 31 into the back 34. A cleat 36 is secured substantially centerwise of the drawer bottom 31, and one half of the molding M is secured to the cleat. A second strip of molding M is secured by means of screws 22 to the shelf 15 substantially centerwise thereof in position to match the molding strip secured to the bottom of the drawer. The molding in this position on the drawer provides a guide and rail for the drawer. The sliding molding thus provides smooth working operation by keeping the drawer true in the cabinet, and providing a track for the drawer. A simple latch, not shown, may be secured to the drawer for preventing the drawer from completely leaving the cabinet, but which may be operated so that the drawer may be removed, such latches being common in the art.

The drawings have illustrated a method of assembling a precut cabinet, and it is obvious that the moldings may be utilized in assembling various types of precut structures not necessarily small cabinets. The molding may be utilized where two parts of building structures are joined in abutting relation, whether the edge of one abuts the side of the other structure or whether two edges are in abutting relation. Further, the molding may be utilized to hang a cabinet from the wall, in which case one part of the molding is fastened to the wall and the other part to the back edges of standards or other convenient locations of the cabinet. After assembly of the molding parts on the wall and on the cabinet, the moldings are intermeshed and the cabinet slid into place on the wall. A block or cleat may be used to prevent sliding of the cabinet from the molding and secure it in place. Furthermore, while the molding has been shown connected to the various parts in such a manner that the molding shows at the joint between the parts, it is obvious that the molding may be counter sunk in one of the parts so that the members of the structure completely cover the molding. This is easily accomplished by grooving one member of the building structure so that the edges of the structure overlap the outside of the molding completely hiding the same when the two building structures are interlocked by means of the molding.

The molding of the invention provides a quick and simple method of joining a box-like structure without the use of clamps, etc. The moldings permit a quick assembly of the parts with a tight joint. The installation of the molding may be accomplished by unskilled or semi-skilled labor, so that pre-cut parts may be inexpensively assembled.

Other modifications and uses of the molding will occur to those skilled in the art, but there is no intent to limit the spirit and scope of the invention to the precise details described in the drawings and specification, except in so far as set forth in the claims.

We claim:

1. A construction molding strip which is arranged for slidable engagement with a piece of molding having a similar cross-sectional configuration, comprising a channel member having one leg longer than the opposite leg mounted at each side of a web, a first flange mounted on said longer leg parallel to and extending centerwise of the web, a second flange mounted on the shorter of said legs unidirectionally with said first flange, said second flange being parallel to and extending away from said web, said first flange being disposed a distance from the web sufficient to reciprocally accommodate a second flange thereunder when each of two facing moldings are positioned together, and a longitudinal rib mounted on said web parallel to and spaced from the longer leg in position to prevent transverse displacement of a second flange engaged beneath said first flange whereby two such strips may be slidably interlocked together.

2. A construction molding strip which is arranged for slidable engagement with a piece of molding having a similar cross-sectional configuration, comprising a channel member having one leg longer than the opposite leg mounted at each side of a web, a first flange mounted on the outer end of said longer leg and lying parallel to and extending centerwise of the web, a second flange mounted on the outer end of shorter of said legs, said second flange being parallel to and extending away from the web of said channel, said first flange being disposed a distance from the web sufficient to accommodate a second flange when each of two facing moldings are positioned with the second flange of each positioned under the first flange of the other, means for securing said strip to a structure, and a longitudinal rib mounted on said web extending parallel to and spaced from the longer leg in position to prevent transverse displacement of a flange engaged beneath said first flange.

3. In a construction molding in which one strip thereof is arranged to be superimposed on and interlocked with a similar strip thereof in longitudinal slidable relation, a channel member having a long leg on one side and a short leg on the other side of the web, a first flange mounted on said long leg, said first flange being parallel to the web and extending centerwise of said channel, a second flange mounted on the short leg of said channel, said second flange being mounted on the end of short leg being in position parallel to said web and extending away from said channel, said first flange being spaced a greater distance from the web than the width of said second flange so as to slidably accommodate a second flange when two such moldings are superimposed one on the other with the second flange of each positioned under the first flange of the other, and stop means mounted on said web in position to prevent transverse displacement of a flange slidably disposed beneath said first flange.

4. In a construction molding in which one strip thereof arranged to be superimposed on and interlocked with similar strip thereof in longitudinal slidable relation, a channel member having a long leg on one side and a short leg on the other side of a web which is substantially wider than the width of said long leg, a first overhanging flange mounted on said long leg and extending centerwise of said channel, a second flange mounted on the short leg of said channel and extending away from said channel, said first flange being spaced a sufficient distance from the web to slidably accommodate a second flange when two such moldings are superimposed one on the other with the second flange of each positioned under the first flange of the other, means for securing said channel to a structure, stop means mounted on said web and extending lengthwise thereof in position to prevent transverse displacement of a flange slidably disposed beneath said first flange.

5. In a construction molding in which two lengths of the molding are arranged to be superimposed one on the other, in a slidable interlocking relation and for attaching to the joining members of a structure comprising a length of rectangular strap, a first projection mounted on an edge of said strap normal to the plane thereof and extending along one side thereof, an overhanging flange mounted on said first projection and extending centerwise thereof, a second projection mounted on the opposite edge of said strap normal to the plane thereof and extending along the opposite side thereto, a second flange on said second projection extending away from said strap, said second flange being positioned closer to the plane of said strap than said first flange whereby a second flange may slidably fit between the strap and said first flange when two such moldings are in face engagement, stop means on said strap spaced from and adjacent to said first projection whereby to prevent transverse displacement of interlocked flanges and whereby to permit longitudinal displacement thereof, and means for attaching said strap to a structure.

6. In a construction molding in which two lengths of the molding are arranged to be superimposed one on the other, in a slidable interlocking relation and for attaching to the joining members of a structure, comprising a length of rectangular strap metal, a first projection mounted on the edge of said strap normal to the plane thereof and extending along one side thereof, an overhanging flange mounted on said first projection extending parallel to said strap and centerwise thereof, a second projection mounted on the opposite edge of said strap extending along the opposite side and normal thereto, said flange extending in the same direction from said strap, a second flange on said second projection extending away from said strap and parallel thereto, said second flange being positioned closer to the plane of said strap than said first flange whereby said second flange may slidably fit between the strap and said first flange when two such moldings are in face engagement, a rib extending longitudinally of said strap spaced from and adjacent to said first projection whereby to prevent transverse displacement of interlocked flanges and whereby to permit longitudinal displacement thereof, and means for attaching said strap to a structure.

7. A preformed cabinet assembly comprising a plurality of pre-cut panels each dimensioned for its predetermined position in an assembled cabinet, a molding member mounted on each side of the panel to panel joining lines on each panel, each said molding member being longitudinal slidable along a cooperative molding member mounted on the opposite side of each joint and being laterally interlocked whereby such panels may be slidably joined together and held together against lateral displacement, all said molding members being of similar cross-section and each including a channel member having extending flanges mounted on the channel legs and arranged for interlocking with the flanges of a companion molding member, a lateral stop on each channel mounted in position to prevent lateral displacement of the interlocking flanges, and means for locking said panels against longitudinally, a slidable displacement.

References Cited in the file of this patent

UNITED STATES PATENTS 2,591,172  Lundine _____ Apr. 1, 1952